United States Patent [19]

Weng

[11] Patent Number: 5,044,197

[45] Date of Patent: Sep. 3, 1991

[54] AIR PRESSURE MEASURING HEAD

[76] Inventor: Hsi K. Weng, No. 306, Her Shuenn Rd., Her Mei, Chang Huah, Taiwan

[21] Appl. No.: 530,709

[22] Filed: May 30, 1990

[51] Int. Cl.⁵ .......................... B60C 23/02; G01L 7/16
[52] U.S. Cl. .................................... 73/146.8; 73/744; 116/34 R
[58] Field of Search ..................... 73/146.8, 146.3, 744, 73/714; 116/34 R

[56] References Cited

U.S. PATENT DOCUMENTS

| Re. 29,116 | 1/1977 | Guy et al. | 73/146.8 |
| 4,858,467 | 8/1989 | Weng | 73/146.8 |

Primary Examiner—Donald O. Woodiel
Attorney, Agent, or Firm—Browdy and Neimark

[57] ABSTRACT

A measuring head for an air pressure gauge having a movable actuating rod and capable of obtaining the car power source from the cigarette lighting socket is provided. The measuring head includes an insulating head tube having a through hole, a conductible actuating rod having an intermediate annual flange and an upper portion protruding beyond the through hole, a conductible plug having an axial through hole, a spring mounted between the plug and the annular flange for tightly urging the flange against the tube, and a conductible sleeve sleeved on the tube and connecting thereto a conducting wire.

3 Claims, 3 Drawing Sheets

AIR PRESSURE MEASURING HEAD

BACKGROUND OF THE INVENTION

The present invention relates to an air pressure gauge, and more particularly to a measuring head therefor.

A conventional air pressure measuring head, as shown in FIG. 1, is generally of plastic and integrally forms thereto an actuating rod which thus gets broken relatively easily since it is immovable and relatively rigid.

SUMMARY OF THE INVENTION

It is therefore an object of the present invention to provide a diversified air pressure measuring head capable of obtaining the car power source from the cigarette lighting socket.

It is further an object of the present invention to provide an air pressure measuring head having a movable actuating rod.

According to the present invention, a measuring head for a gauge for measuring an air pressure of a tire, adapted to conduct therethrough the air pressure to act upon a pistion and an indicating rod of the gauge having a first spring urging the piston to act against the air pressure includes an insulating head tube having a through hole, a conductible actuating rod received in the through hole and having an intermediate annular flange and an upper portion protruding beyond the through hole, a conductible plug connected to the head tube, having an axial throught hole and mounting thereunder, the piston, a second spring mounted between the plug and the intermediate annular flange for tightly urging the annular flange against the head tube, and a conductible sleeve sleeved on the head tube and connecting thereto a conducting wire.

The present invention may best be understood through the following description with reference to the accompanying drawings, in which:

DETAILED DESCRIPTION OF THE PREFERRED EMBODIMENT

Figure 1:
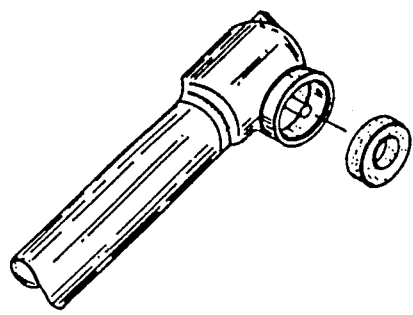
FIG. 1 is a perspective view showing an air pressure measuring head according to the prior art.
Figure 4:
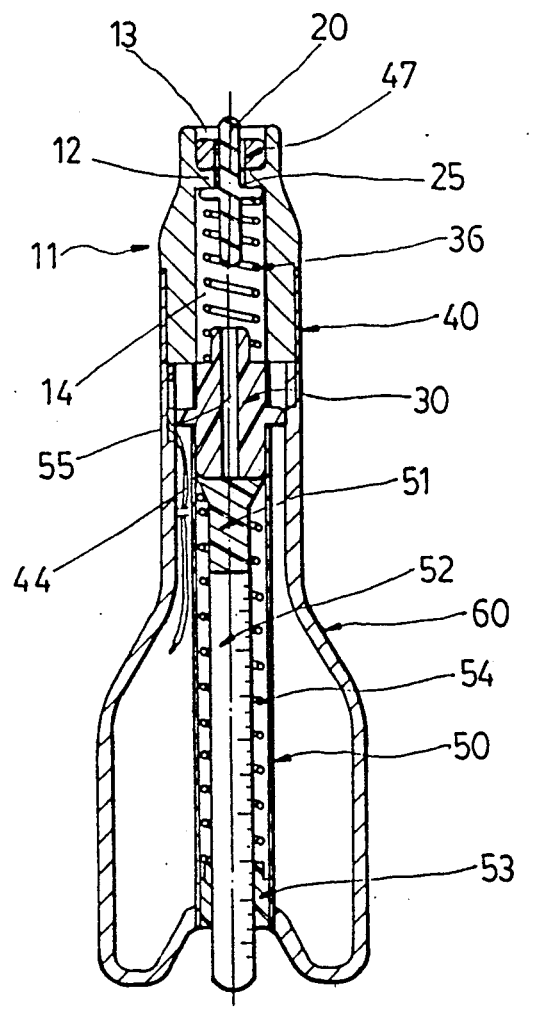
FIG. 4 is a sectional view taken along line 4—4 in FIG. 2.
Figure 2:
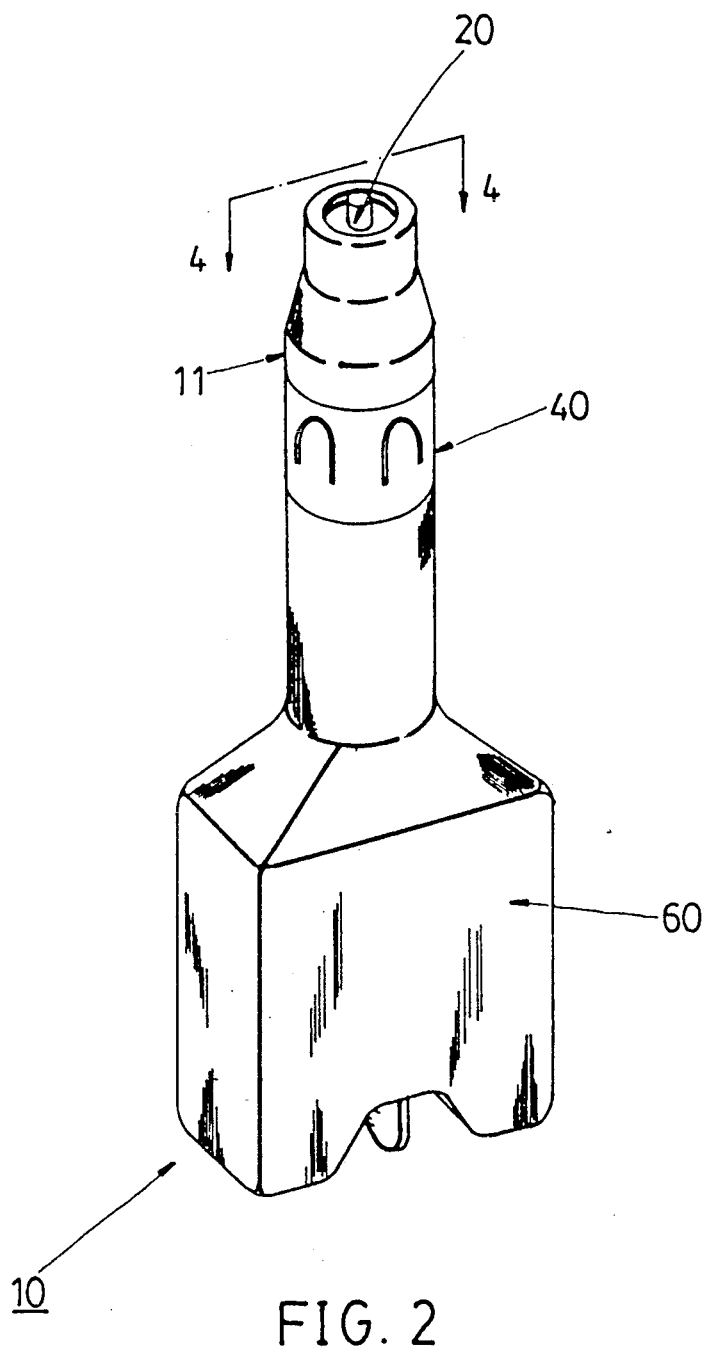
FIG. 2 is a perspective view showing a preferred embodiment of an air pressure measuring head according to the present invention.
Figure 3:
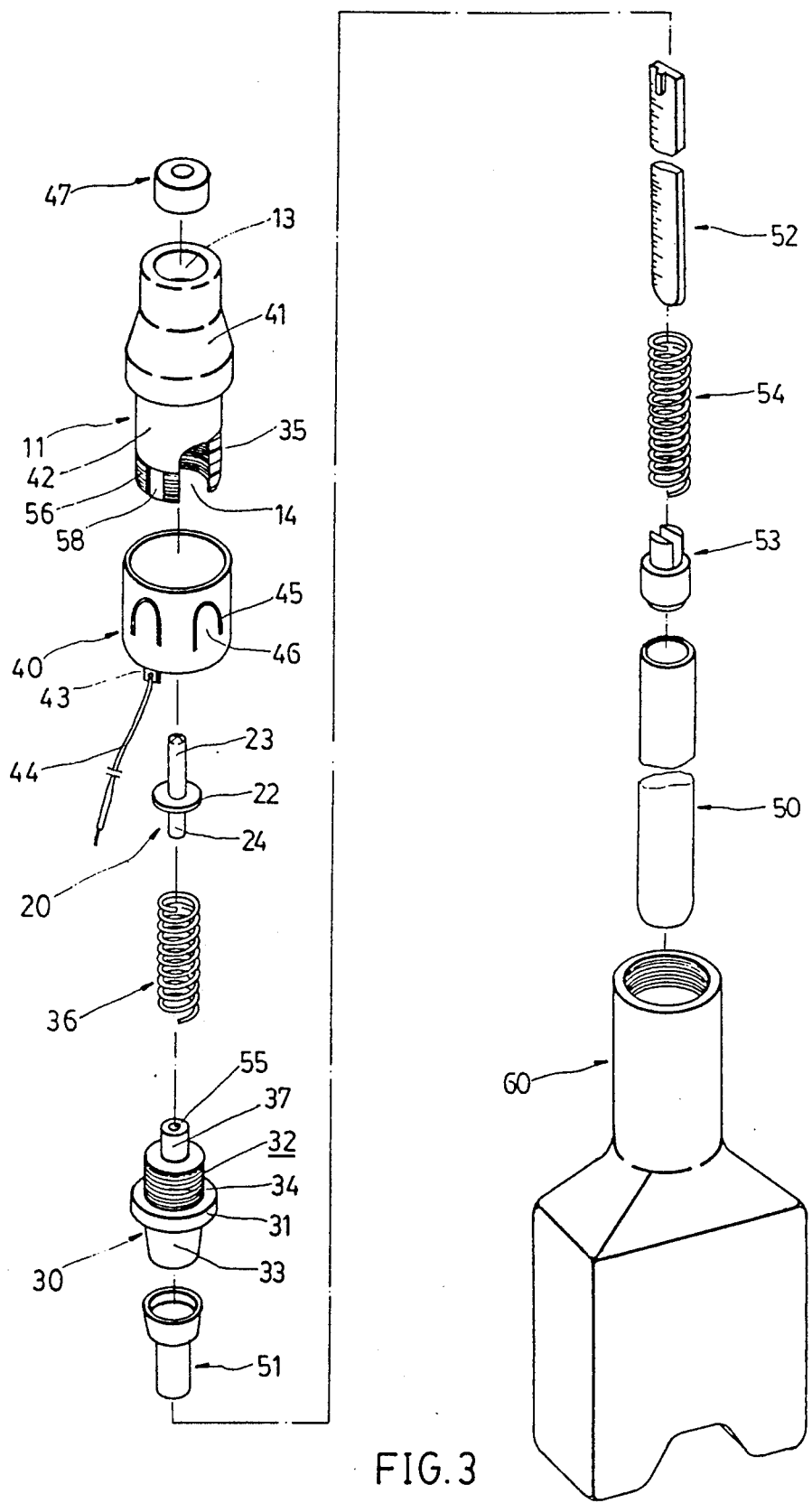
FIG. 3 is an exploded view of a measuring head in FIG. 2.

Referring now to FIGS. 2–4, a measuring head for an air pressure gauge 10 according to the present invention includes a plastic head tube 11 having a through hole 13, 25,14, a conductible actuating rod 20 received in through hole 13,25,14, a conductible plug 30, a spring 36 mounted between plug 30 and rod 20, and a conductible sleeve 40 sleeved on head tube 11. Gauge 10 further includes a piston 51 mounted under plug 30, an indicationg rod 52 placed under piston 51, a casing 60 fixed to head tube 11, a conductible tubular element 50 secured in casing 60, a fixture 53 fixed in element 50 and passing therethrough rod 52, and a spring 54 mounted between piston 51 and fixture 53.

Head tube 11 includes an intermediate diaphragm 12 having a central opening 25, an upper chamber 13 receiving therein an annular pad 47, a lower chamber 14, an upper outer wall 41, a lower outer wall 42 sleeving thereto sleeve 40, a female screw thread 35, a male screw thread 56 engaging in casing 60, and a lower indentation 58. Actuating rod 20 includes an intermediate annular flange 22, an upper portion 23 protruding beyond opening 25 and chamber 13, and a lower portion 24.

Plug 30 includes an intermediate annular flange 31, a lower portion 33 sealingly received in element 50 and mathcing thereunder pistion 51, an axial through hole 55, and an upper portion 32 having a central protrusion 37 and a threaded portion 34 engaging with female thread 35. Spring 36 has its two ends respectively sleeved on portion 24 and protrusion 37 for urging annular flange 22 against diaphragm 12. Sleeve 40 includes a lug 43 connecting thereto a conducting wire 44, and a plurality of U-shaped grooves 45 enabling corresponding walls 46 to be properly elastical. Conducting wire 44 passes through indentation 58 into casing 60 capable of mounting therein kinds of electrical apparatus, e.g. a voltage lowering device or a circuit for testing the battery power source.

In use, chamber 13 inserts therein an air valve of a tire and actuating rod 20 urging against the air valve will inwardly retract to allow the pressurized air in the tire to pass through opening 25, chamber 14 and axial hole 55 to downwardly urge piston 51 against spring 54 so that one can obtain the tire air pressure from the reading shown on indicating rod 52 protruding out of tubular element 50 and casing 60. Since actuating rod 20 is urged upwardly by spring 36, actuating rod 20 will not get broken easily.

When the present measuring head is inserted in a cigarette lighting socket of a car having a battery power source, the battery power source can be readily obtined by means of the present measuring head since actuacting rod 20, spring 36, plug 30 and tubular element 50 constitute a first conducting wire and a second conducting wire is formed by sleeve 40 and wire 44. The first and second conducting wires can thus be used to energize an electrical apparatus.

What I claim is:

1. A measuring head for a gauge for measuring an air pressure of a tire, adapted to conduct therethrough said air pressure to act upon a piston and an indicating rod of said gauge having a first spring urging said piston to act against said air pressure, and comprising:

an insulating head tube having a through hole;

a conductible actuting rod received in said through hole and having an upper portion protruding beyond said through hole, an intermediate annular flange, and a lower portion;

a conductible plug connected to said head tube, having an axial through hole, and adapted to mount thereunder said piston;

a second spring mounted between said plug and said intermediate annular flange for tighlty urging said annular flange against said head tube; and a conductible sleeve sleeved on said head tube and connecting thereto a conducting wire.

2. A measuring head according to claim 1 wherein said head tube includes an intermediate diaphragm against which said second spring urges said annular flange.

3. A measuring head according to claim 2 wherein said diaphragm mounts thereon an annular pad.

* * * * *